Oct. 22, 1940.   J. H. K. McCOLLUM ET AL   2,219,269

VACUUM POWER CLUTCH

Filed Jan. 17, 1931   3 Sheets-Sheet 1

INVENTORS
James H. K. McCollum
Henry J. DeNeville McCollum
By
R. Parker Smith
ATTORNEY

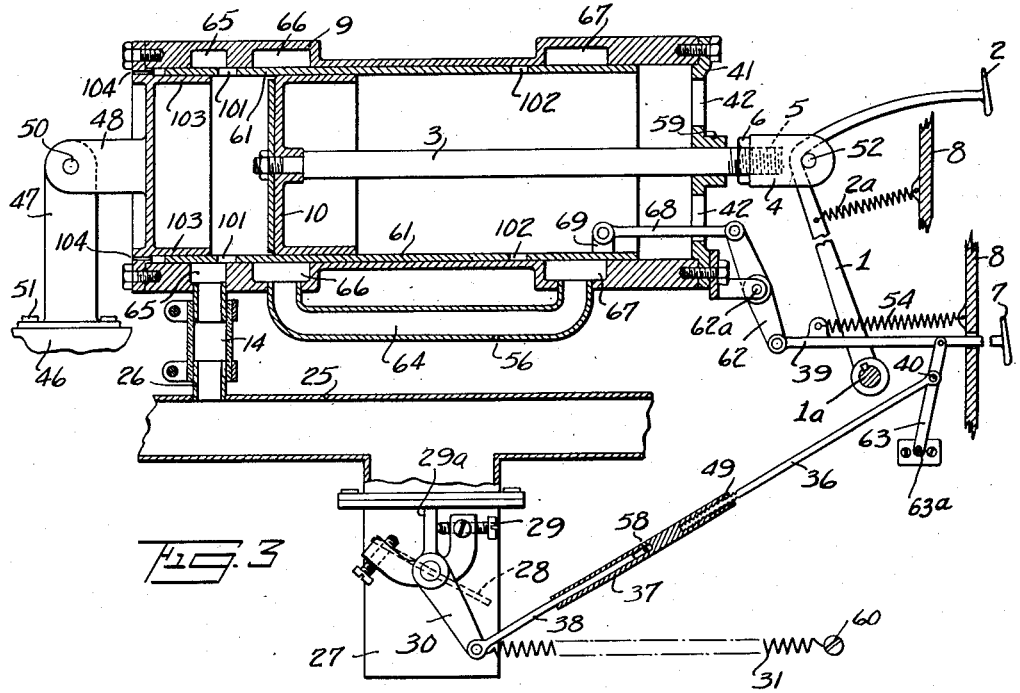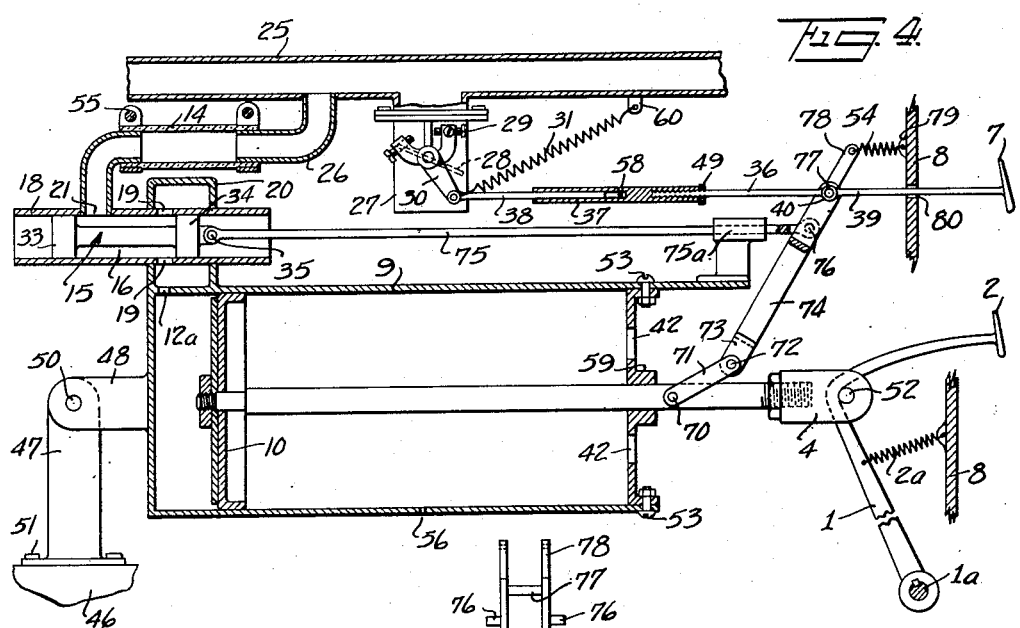

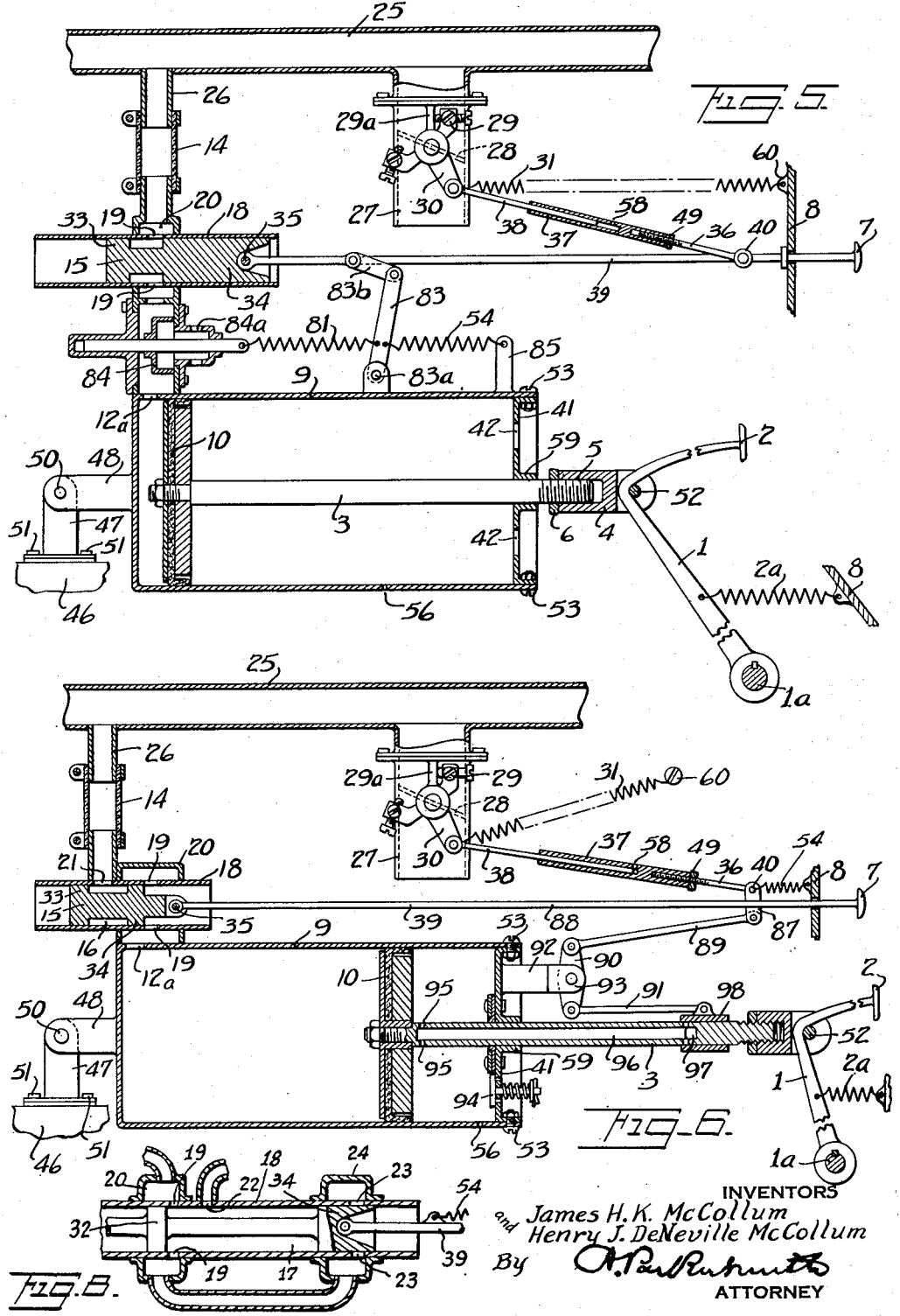

Patented Oct. 22, 1940

2,219,269

UNITED STATES PATENT OFFICE 2,219,269

VACUUM POWER CLUTCH

James Harry Keighley McCollum and Henry John De Neville McCollum, Long Branch, N. J.

Application January 17, 1931, Serial No. 509,310

43 Claims. (Cl. 192—.01)

Our invention relates to improvements in vacuum power clutches and the objects of our improvements are, first, to provide an automatic power clutch mechanism which will start the motor vehicle from a standstill in a very smooth manner and without any jerking, second, to provide a power clutch mechanism which will allow of gradual and smooth acceleration in all speeds and gears, third, to provide a power clutch mechanism which will permit of free-wheeling, or coasting, in any gear, including reverse, and which will, at the same time, allow using the engine as a brake when going down very steep grades, or at any other time and in any gear, fourth, to provide a power clutch mechanism which will allow the use of the left foot for operating the service brake while the accelerator is being operated by the right foot, thus preventing back-rolling on upgrades in the most effective manner, fifth, to provide an automatic vacuum power clutch mechanism which will permit of driving, free-wheeling or coasting, and braking with the engine, in any gear forward or reverse without touching the clutch pedal and by the sole manipulation of the accelerator only, and to produce a two-stage clutch engaging movement which will permit a rapid initial closing movement of the clutch actuating member until an initial engagement has been produced, and thereafter a slower movement of said member while completing said engagement.

The best forms of apparatus at present known to us embodying sundry modifications of our invention are illustrated in the accompanying three sheets of drawings in which, Fig. 1 is a diagrammatic vertical section of a power-operated clutch controlling apparatus with its attachment to certain parts of a motor car, which latter parts are shown broken away, one end of the power cylinder being open to the atmosphere;

Fig. 3 is a similar view of a modification of the construction shown in Fig. 1, in which a sleeve valve located inside of the power cylinder is employed for controlling the admission of air thereto and withdrawal therefrom.

Fig. 4 is a similar view of a second modification of the type of apparatus shown in Fig. 1, in which a special automatic action of the air inlet valve also produces a two-stage modification of the clutch engaging member.

Fig. 5 is a similar view showing a third modification of the type of construction shown in Fig. 1 in which the two-stage movement is produced by the automatic action of another form of air inlet valve.

Fig. 6 is a similar view showing a modification of the type of apparatus illustrated in Fig. 2 in which an automatic valve operating mechanism of another type is illustrated.

Fig. 7 is a detail view of floating lever 74, illustrated in Fig. 3, parts being broken away; and Fig. 8 is a detail in longitudinal section showing a modification of Fig. 1, in which the leakage port 56 is omitted.

Figure 1:
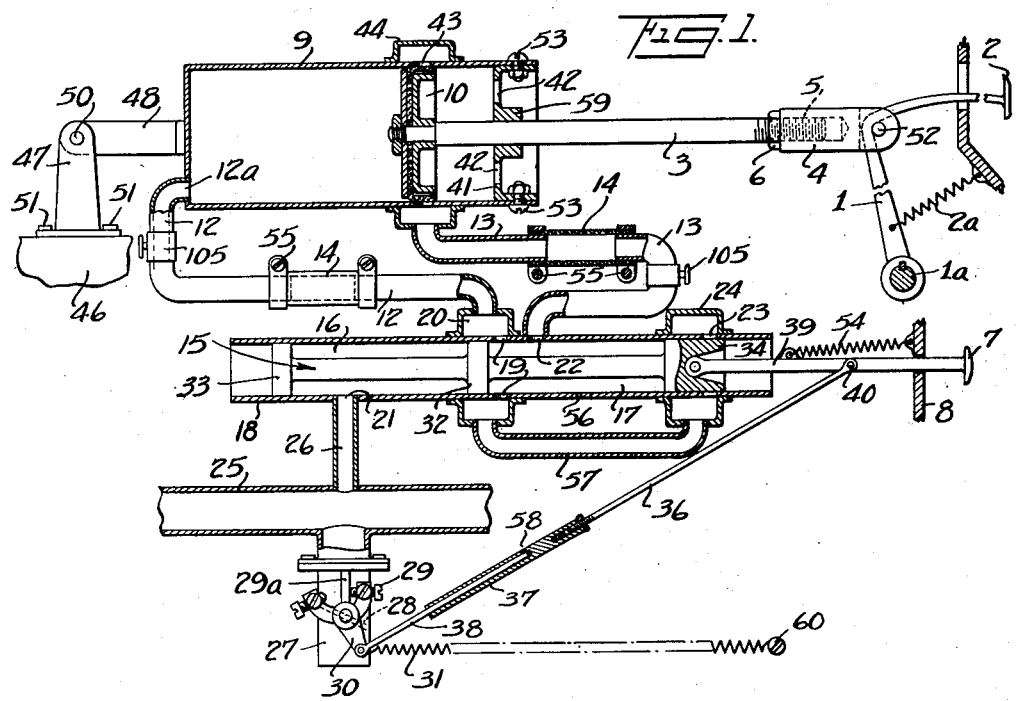

In the drawings like reference characters indicate like parts. In all forms of the invention here illustrated the clutch is actuated by a pneumatic cylinder containing a piston which is drawn inwardly to disengage the clutch when the interior of that end of the cylinder is connected to the intake manifold of the motor and the clutch engagement is produced by the action of the usual clutch springs when the connection to the intake manifold has been cut off and air is allowed to enter the cylinder to equalize the pressure on the two sides of the piston. The clutch closing motion of the piston is produced in two stages by means of automatic control of the inflow or outflow of air to or from the said cylinder.

In Figs. 1, 3, 4 and 5 the cylinder is open to the atmosphere at the end through which the piston rod extends and the rate of outward movement of the piston is controlled by throttling or wire-drawing air admitted to the other end thereof in which a partial vacuum exists at the beginning of said outward movement. In the forms shown in Figs. 2 and 6 air is freely admitted to the vacuum space in the cylinder during the entire outward stroke of the piston, but during the latter portion thereof air is trapped in the other, closed end to act as an air cushion to check its speed of final movement. The above being the general principle of operation of the various forms of the invention shown, a detailed description of the various constructions is as follows:

Referring to Fig. 1, 2 is the usual clutch pedal of a motor car, a portion of the chassis of which is shown at 46. This pedal is mounted on the clutch lever 1, which is keyed to the clutch operating shaft 1a and normally held in a clutch engaging position by the tension of the spring 2a.

25 is a section of the intake manifold of the motor to which the combustible mixture is admitted through the carburetor 27 having a throttle valve 28 of the usual butterfly type operated by the throttle lever 30 and limited in its movements by the adjustable stop mechanism 29 cooperating with the fixed stop rib 29a. This throttle valve is normally held in nearly closed or idling position by the spring 31 anchored at 60. It can be opened by motion of the pedal 7 mounted on rod 39 projecting through footboard 8 and having a pivotal connection at 40 to the accelerator rod 36 which has a lost motion connection to the throttle rod 38 which is pivoted to the throttle 30. The cup-shaped sleeve 37 is adjustably mounted on the end of the rod 36 by means of the screw thread connection there shown and can be locked in any position of adjustment by the lock-nut 49. Throttle rod 38 slides in this sleeve and when the pedal 7 is fully retracted by the action of the spring 54, there is a gap left between the end of rod 38 and the bottom of cup-shaped sleeve 37. Ports 58 admit air to this space so as to permit free movement of the parts. When the pedal 7 is forced by the operator's foot toward the left the first action will be to take up the lost motion and thereafter subsequent movement of the pedal will cause opening movement of the throttle valve.

The power mechanism for operating the clutch shown in this figure comprises the vacuum cylinder 9 which is pivotally mounted on the chassis 46 by means of the pedestal 47 fastened to the chassis by screw bolts 51, 51, and the lug 48 projecting beyond the closed end of the cylinder and hinged or pivoted to the pedestal 47 at 50.

In the cylinder 9 is the piston 10 provided with the usual cup-leather packing and rigidly connected to the piston rod 3 which projects outwardly, through perforated boss 59 in the skeleton cylinder head 41, which is provided with ports 42 and held in the open end of the cylinder by stove bolts 53. On the outer end of the piston rod 3 is the screw thread 5 by means of which it is adjustably connected to the fork 4 which carries the pin 52 in its open end, forming a pivotal connection with the pedal lever 1. 6 is a lock-nut on the piston rod. 12 is a conduit connected to the closed end of cylinder 9 by the port 12a and connected at its other end to the annular port-casing 20 on the casing 18 of the piston valve 15. 14 is a short section of rubber hose inserted for joining two portions of the conduit 12 and forming an air-tight connection therewith by means of the hose clips 55. The intake manifold 25 is connected by conduit 26 to the interior of valve casing 18 through port 21. Port-casing 20 is connected to the interior of said valve casing 18 by a plurality of ports 19. The piston valve 15 has two sections reduced in diameter, forming annular valve spaces 16 and 17 within the casing 18. The full diameter piston portions of the valve, 32 and 33, cooperate with the ports 19 and 21 respectively as the valve is reciprocated, being so spaced apart that when the piston valve is moved to the right so that the piston portion 32 passes to the right of ports 19, communication will be afforded from the intake manifold 25 to the cylinder port 12a. The cylinder 9 is also provided with a plurality of ports 43 in its walls at a point intermediate of its ends and these ports are surrounded by annular port casing 44 which is connected by conduit 13 to a port 22 in the valve casing 18. This conduit is also provided with a flexible rubber hose section 14. The annular port-casing 20 is also connected by conduit 57 to another annular port casing 24 which surrounds a plurality of ports 23 near the right-hand end of the valve casing 18. The piston valve 15 is connected to the pedal 7 and valve rod 39 by wrist-pin 35. The right hand end of the piston valve has a full diameter section 34 which reciprocates across the ports 23 so that by reciprocation of the whole valve 15 air may be admitted to the left hand portion of cylinder 9 through ports 43 and conduits 13 and 12 when piston 10 is to the left of ports 43 and can be either admitted to or prevented from entering said cylinder after piston 10 has passed to the right of said ports 43 according to the manipulation of the valve 15, as will be hereinafter explained. 56 is a leakage port of small cross-sectional area located in the valve casing 18, which permits a slow leakage of air to the interior of cylinder 9 at any time when the proper connections are established.

Figure 2:
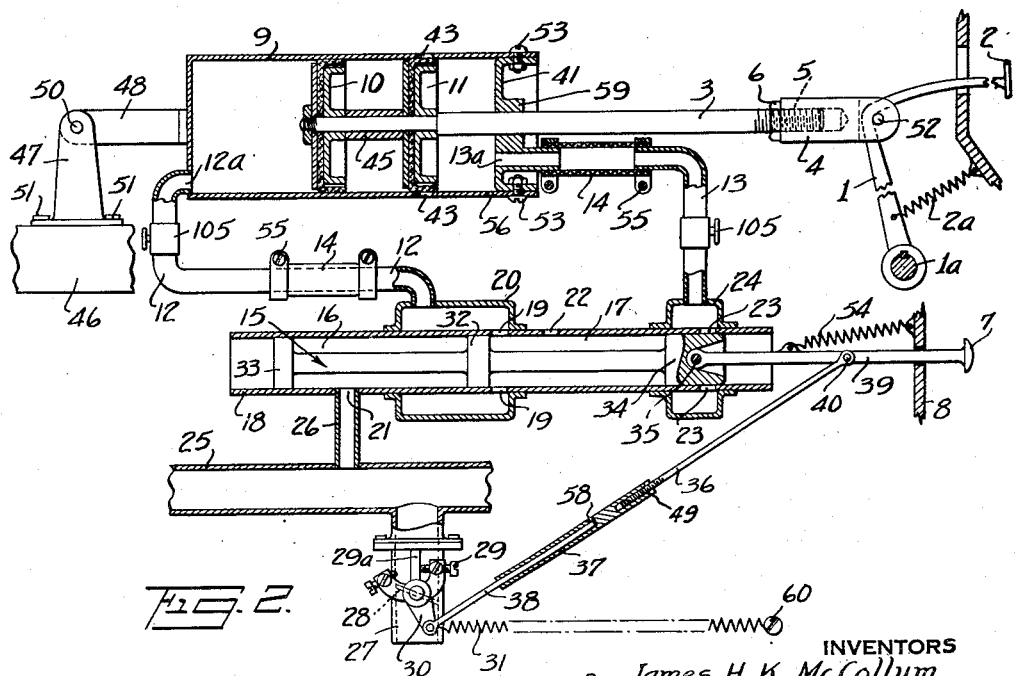
Fig. 2 is a similar view of a modified form in which both ends of the power cylinder are closed.

Referring to Fig. 2, the main portions of the apparatus there shown are the same in arrangement and operation as those described with reference to Fig. 1, excepting such modifications as are necessary to produce the air cushioning or door-check action which results from the fact that in this figure the cylinder head 41 is airtight with the exception of the port 13a which is connected by conduit 13 to port-casing 24 on the valve casing 18 and that end of the cylinder is therefore closed to the exterior atmosphere except through the leakage port 56. In order to produce an earlier checking of the outward movement of the piston rod 3 than would otherwise occur, the second piston 11 is mounted thereon, being spaced away from the main piston 10 by spacing sleeve 45. The conduit 57 connecting port casings 20 and 24 in Fig. 1, is dispensed with in Fig 2, and port 22 in valve casing 18 is open to the atmosphere instead of opening into conduit 13, as in Fig. 1. As result of these changes there is no cutting off of the inflow of air to the suction end of cylinder 9 during the outstroke of the piston to produce a slower final stage of movement, but there is, on the other hand, a trapping of air in the right hand end of the cylinder after the false piston 11 has lapped the ports 43, which serves this retarding purpose, the air so trapped being expelled gradually through the leakage port 56, which in this case is in the cylinder wall near the right hand end thereof.

Referring to Fig. 3 the construction there shown is similar in principle to that in Fig. 1, the main change being the location of the air-inlet controlling valve inside of the cylinder 9, which valve is in the form of a reciprocating sleeve 61. The intake manifold 25 is in this modification connected through conduit 26 to annular port-casing 65 located near the closed end of the cylinder 9 and surrounding the end of the sleeve 61 and the ports 101 in said sleeve when it is in the left hand position shown in Fig. 3, 66 is another annular port-casing adjacent casing 65, also surrounding the sleeve 61 and connected by conduit 64 to a third annular port-casing 67 located near the open end of the cylinder and also surrounding the sleeve 61 and also ports 102 in said sleeve, when said sleeve is moved to the right. Reciprocating motion is given to the sleeve by means of the link 68 pivoted to the lug 69 on the sleeve interior, said link being pivoted at the other end to one end of the lever 62 which vibrates on a fixed pivot 62a, and at its other end is connected to the valve rod 39. By this chain of mechanism movements of the pedal 7 are reversed and transmitted to the valve sleeve 61. In this construction the leakage port 56 is located in the conduit 64. A reduced motion of accelerator rod 36 results from connecting it to a lever 63 which has one end mounted on a fixed pivot 63a and the other end connected to valve rod 39.

Referring to Fig. 4, the modified elements there shown comprise a special form of the suction control valve 15, which affords connection from the cylinder to the intake manifold 25. The valve casing 18 is connected to said cylinder through the port 12a and port casing 20, which in this case is directly connected to port 12a, the conduit 12 being omitted. The valve casing 18, as in previous figures, is connected to the intake manifold through conduit 26 and, as the valve is mounted on the cylinder and vibrates with it on the hinge 50, a rubber hose section 14 is inserted in said conduit 26. The valve 15, instead of being directly connected to valve rod 39, is indirectly connected thereto through valve rod 75 which reciprocates in the fixed guide 75a and is pivoted by pin 76 at its other end to the floating lever 74, which latter is pivoted at one end by pin 77 to the accelerator rod 36, which in this case extends out through the opening 80 in the footboard 8 and carries the pedal 7 on its projecting end. The other end of floating lever 74 is forked at 73 and connected by pivots 72, 72, to the links 71, the other ends of which are pivoted to the piston rod 3 at 70. The valve retracting spring 54 in this construction is connected to a projection 78 on the upper end of lever 74.

In this construction the leakage port 56 is located in the walls of cylinder 9.

Referring to Fig. 5, the suction controlling valve 15 is of the piston type with the right hand piston portion elongated so that the valve ports 19 will not be opened to the atmosphere during even a prolonged additional movement of the valve to the left after said suction ports have been closed during the first part of said motion. Air in this modification is admitted to the cylinder 9 to permit the outward movement of the piston 10 through the spring poppet or reducing valve 84 which admits air to the conduit 12 through ports 84a when it is unseated by the unbalanced atmospheric pressure whenever a partial vacuum exists in the left hand end of cylinder 9. Normally, valve 84 is held seated by tension spring 81 which is anchored on the lever 83 swinging on fixed pivot 83a and connected by pivoted link 83b to the valve rod 39.

The suction valve spring 54, anchored at 85, is connected to lever 83 and normally holds the piston valve 15 in a position such that the annular groove therein registers with the ports 19 and permits the full intake manifold vacuum to also exist in conduit 12 and cylinder 9, the tension of spring 81 then being sufficient to hold valve 84 to its seat, but when pedal 7 is pressed to the left and valve 15 also moves to the left, cutting off the suction connection, the reduced tension on spring 81 permits valve 84 to be unseated, so that air enters through ports 84a to cylinder 9 until equilibrium between the clutch spring 2a (which is producing a sub-atmosphere in the cylinder) and the spring 81 is reestablished, whereupon the valve gradually closes. The leakage port 56 is again located in the wall of cylinder 9.

Referring to Fig. 6, a modification of the air-cushion construction of Fig. 2 is there shown. The double piston valve 15 again controls the suction connection from the manifold to the cylinder 9, its port-casing 20 being mounted directly on the cylinder, but the right hand piston portion 34 is short so that the usual amount of movement of the valve to the left will open ports 19 to the atmosphere through the right hand end of valve casing 18 after said ports 19 have been cut off from the intake manifold connection. The middle portion of the piston rod 3 in this case is made hollow having the bore 96 connected to the right hand portion of the interior of cylinder 9 by port 95 near the piston and to the atmosphere through ports 97 near the outer end of the piston rod; ports 97 are controlled by a valve sleeve 98 sliding on the piston rod and connected by pivoted link 91, a walking beam 90, pivoted link 89 and pivot lug 87 to the valve rod 39. Walking beam 90 vibrates on a fixed pivot in fork 93, supported by housing 92, which is fixed on the cylinder head 41. 94 is an inwardly-opening spring-closed air valve mounted in said head 41. The slow final movement of the piston is here caused by the trapping of air in the right hand end of the cylinder when the ports 97 in the piston rod enter sleeve 98. Thereafter the trapped air slowly escapes through the leakage port 56 in the walls of cylinder 9 near the right hand end thereof.

The operation of the construction shown in Fig. 1 may be described more in detail as follows:

The positions of the parts shown in Fig. 1 are the positions that they assume at an intermediate stage of their movement occurring when starting the automobile or motor vehicle from a standstill. The part of the interior of the cylinder 9 to the left of piston 10 had thereby been first connected to the atmosphere by a movement of the valve 15 to the position there shown, which established communication with the atmosphere through the ports 42 and 43, port-casing 44, piping 13 and 14, port 22, annular valve groove 17, ports 19, port casing 20, piping 12 and 14 and port 12a. This first stage of movement continued after the piston valve 15 had been moved into the position shown in Fig. 1 until the piston 10 closed the ports 43 as shown in Fig. 1, which shut off further free inflow of air as above described. As soon as this took place the piston 10, piston rod 3 with its lock-nut 6 and fork 4 and clutch lever 1 with its pedal 2, all of which had been moving rapidly to the right, came to a stand-still, practically, having thereby engaged the clutch with the percentage of its full engagement pressure which is necessary to allow the proper amount of slippage to make a smooth, jerkless start from a standstill, and equally necessary to pick up the motor when changing over from free wheeling at any considerable speed. With the piston 10 in the position shown in Fig. 1, closing the ports 43, the clutch can be adjusted at any time by loosening lock nut 6 and screwing piston rod 3 into or out of fork 4 to the proper position to cause clutch engagement to have the proper percentage of its full pressure necessary to allow the clutch to slip sufficiently to secure the above stated desired result, and then setting up lock-nut 6. The piston 10 will turn in cylinder 3 to permit this adjustment whenever lock-nut 6 has been loosened for the purpose of shortening or lengthening the distance between the pin 52 and the piston 10 so as to secure the above stated result. To hold the parts in the adjusted position the lock-nut 6 is tightened against the fork 4. As the friction members of the clutch wear down the desired checking of the movement of the movable member thereof at the point when initial contact occurs between the two friction members may be still maintained by increasing the effective length of piston rod 3 in the manner above described.

While the piston 10, rod 3, fork 4, clutch lever and clutch are in the position shown in Fig. 1 with the clutch engaged, it having only the proper percentage of the full engagement pressure to make such a smooth, even and jerkless start from a stand-still, the pedal 7 can be moved still farther to the left so as to open the carbureter throttle, so that the engine will develop additional power sufficient for completing the start from a stand-still, as described above, without altering the conditions mentioned above for producing the initial clutch engagement. Also if the valve 15 is held in the position shown in Fig. 1 for a sufficient length of time, air gradually leaking in through the small hole or leakage port 56 will pass into the left hand end of the cylinder 9 and allow piston 10 to continue gradually moving to the right until the clutch is engaged with its full pressure, thus completing the second and final stage of the clutch engaging movement. This permits the use of the motor as a brake, the clutch being then engaged with its full pressure while the carbureter throttle is maintained in its idling position, the movement of pedal 7 necessary to effect this clutch engagement having been just sufficient to take up the lost motion between parts 37 and 38 so that the throttle had not yet been moved.

If the pedal 7 and valve 15 are moved far enough to the left to allow connection of the piping 57 with the outside atmosphere by means of the ports 23, the right hand end of the piston valve 15 having been thus moved to the left past the right hand edges of the ports 23, the piston 10 will rapidly move to the right far enough to allow the clutch to be engaged to its full pressure, irrespective of the position of piston 10 in the cylinder 9 when its motion to the right commenced, air then flowing freely through conduit 57, ports 19, annular valve space 17, port 22, conduit 12 and port 12a to the space behind piston 10 continuously, and also through port 22, conduit 13, and ports 43, after the piston has passed the latter ports. The mechanism as shown is designed to do this when the pedal 7 is moved far enough to the left so that a very rapid and full pressure engagement of the clutch can be had when the automobile, or motor vehicle, is in second or high gear, or in any other gear, when it is desired to obtain very rapid acceleration on the green light, or at any other time, when a smooth start from the standstill is sacrificed for the sake of excessively prompt acceleration.

When it is desired to free wheel or coast, the pedal 7 is allowed to move to the right hand under action of the spring 54 as far as it can go. This moves the piston valve 15 to the right far enough to connect the ports 19 with the port 21 through the annular groove space 16 around the valve, whereupon the vacuum in the intake manifold, existing when the carburetor throttle valve 28 is in its idling position, exhausts the air in the cylinder 9 to the left of the piston 10, thereby moving the piston to the left and rapidly disengaging the clutch, the pressure in the cylinder 9 to the right of the piston 10 then being full atmospheric pressure, since such space in cylinder 9 to the right of piston 10 is always connected to the atmosphere by the open ports 42 in cylinder head 41. With the parts in the position shown in Fig. 1, the fact that the cup leather packing of the piston 10 has closed the ports 43, thereby stopping nearly all air from passing into the cylinder 9 to the left of piston 10, sufficiently retards the final stage of the motion of piston 10 to the right to give a smooth, jerkless and ideal start from a standstill, and each such start from a standstill is thus always made under exactly the same ideal conditions, so that such action will always be uniform and not produce the erratic variety of starts from a standstill that are made when, or if, some form of automatic power clutch is not used.

It may be pointed out that the accelerator pedal 7 and double set of operative connections both to the carburetor throttle and to the valve mechanism 15, 18, 32, 33, and the conduits extending therefrom constitute in effect a device jointly controlling the power output of the engine and the driving connection of such engine (clutch controlled by lever 1) with the vehicle. Also, that the third valve piston 34 together with cooperating ports 23 which are open to the atmosphere, constitute positive mechanical means for disabling the control, by said device, of the driving connection (i. e., said clutch) without disabling the control by said device of the engine power. Also, that the throttle valve and the clutch controlling valve mechanism (which latter comprises piston 32 cooperating with ports 19, 21 and 22) may be operated by the manually actuated accelerator 7 sequentially, and thereafter simultaneously in such fashion that said controlling valve mechanism may be rendered inoperative (i. e., when ports 23 are opened) to control the servo-motor (formed by vacuum cylinder 9 and piston 10) without, however, rendering said accelerator's control of throttle valve inoperative,—said throttle-control continuing throughout the entire range of possible throttle opening, most of which occurs after the servo motor has been completely disabled by opening of the ports 23 so that the clutch is left entirely under the control of the closing springs.

The only difference between the mechanism shown in Fig. 2 and that shown in Fig. 1 is that the clutch is held in engagement with the proper percentage of the full clutch engagement pressure to give such a smooth, jerkless start from a standstill by having that part of the cylinder 9 to the right of the false piston 11 air-tight, practically, so as to form an air cushion which is slowly reduced in effectiveness like that of a pneumatic door-check when the ports 23 in Fig. 2 are closed by the right hand edge of piston portion 34 of the piston valve 15, when it is in the position shown in Fig. 2, so that when the piston 11 has closed the ports 43, air is trapped in the right hand end of the cylinder and the pistons 10 and 11 can only move very slowly to the right thereof as the trapped air slowly escapes through leakage port 56. But if the pedal 7 is moved to the left sufficiently to open the ports 23 to the atmosphere, so that the space in cylinder 9 to the right of the piston 11 is then directly connected to the atmosphere, the pistons 10 and 11 will move to the right, from any position in the cylinder 9, rapidly and give the clutch its full engagement pressure at once. Also, after the pistons 10 and 11 have reached the position shown in Fig. 2, the pedal 7 can be moved slightly farther to the left without the right hand piston portion 34 of the valve 15 opening the ports 23, so that the engine can then develop the proper small amount of additional power to give the ideal, smooth and jerkless start from a standstill, the clutch having been engaged with the proper percentage of the full engagement pressure for the said start from a standstill. When it is desired to free wheel or coast, the pedal 7 is allowed to move as far to the right as it will go under the action of spring 54 and the intake manifold 25 of the engine with the maximum vacuum then existing therein, because the carbureter throttle valve is in idling position, will be connected to the part of the interior of cylinder 9 to the left of piston 10, thereby fully disengaging the clutch. The leakage port 56 in Fig. 2 performs the same function and for the same purposes as does the port 56 in Fig. 1.

When the pedal 7 (Figs. 1 and 2) is in its farthest position to the right, the cup-shaped sleeve 37 has slid to the right on the rod 38, after the throttle closed, thus leaving a gap between the end of the rod 38 and the bottom of the said sleeve 37 which is mounted on the end of rod 36; but with the parts in the position shown in Figs. 1 and 2, the end of rod 38 is in contact with the bottom of said sleeve 37 so that the throttle is operated by any further movement of pedal 7 to the left. Holes 58 in sleeve 37 serve to prevent air locks, which might prevent quick opening of such gap.

Two-way valves 105 of any desired construction can be inserted in the conduits 12 and 13 so as to connect either or both ends of the cylinder 9 to the atmosphere continuously, and simultaneously disconnect the rest of the mechanism from said cylinder, if it is desired to run the car in the ordinary manner without using our invention, or piping can be so arranged as to permit of the use of the one double two-way combination valve for these purposes, all as shown in our co-pending patent application, Serial Number 503,767, filed December 20, 1930.

The spring 54, yielding to a light tension allows of an additional resistance being felt by the operator's foot resting on pedal 7 whenever the end of rod 38 comes against the bottom of the tubular member 37 on the end of rod 36, the added resistance of spring 31 then coming into action as the throttle of the carbureter 28 then begins to open slowly from the idling position. When this resistance is felt by the foot the operator will know that the right position of the parts for using the engine as a brake, or for running the car slowly with the carbureter in idling position, has been obtained because this resistance can be felt by the foot without even moving the carbureter throttle valve from its idling position. In fact the best position for the parts for using the engine as a brake is just at the point where this resistance is felt by the foot, the carbureter throttle being still in an idling position.

If desired, the ports 56 can be dispensed with in some or all of the modifications illustrated as there probably will be enough leakage of air passing piston 10, or around piston valve 15, to allow complete closure to be ultimately effected, even if the valve element control by the accelerator is left (after a gear shifting operation for instance) in a position lapping the port through which air normally passes to permit said clutch closure, and that condition persists while the car is running with its throttle only slightly opened. Such modification of the form of the invention illustrated by Fig. 1 is shown in Fig. 8. In such modification, valve piston 34, cooperating with valve ports 23, constitute control means for causing retarded movement of the clutch lever 1, and of the clutch elements (not shown) into engagement with each other. With a small leakage port 56, this valve would still have control of such closing movement to a considerable extent. Also, another method of using the engine as a brake can be employed in any case; that is, the pedal 7 can be moved far enough to the left to give a rapid and full engagement of the clutch as above described, and then such pedal can be allowed to move back to the right until added pressure against the operator's foot, caused by the tension of the spring 31, can no longer be felt, thus bringing the parts into the position shown in Figs. 1 and 2.

While the car is free wheeling at a high speed, if the parts are put into positions shown in Figs. 1 and 2 the engine, which is then idling, can be picked up, i. e. connected to the driving shaft and rear axle and brought up to a speed corresponding to that at which the car is moving, without any jar or jerk being felt. Thereafter pedal 7 can be moved farther to the left to give the clutch its full engagement and to thereafter increase the power of the motor to any desired extent.

The forms of mechanism shown in Figs. 1 to 6 can be used in conjunction with the mechanism shown in our Patents No. 1,858,999, granted May 17, 1932, and No. 1,890,398, granted December 6, 1932.

The two-stage action shown in Figs. 1 and 2 can be obtained by various other forms of mechanism involving mere reversals or rearrangements of the parts there shown, said reversed or rearranged parts still operating on the same general principle. Other forms of valve could be substituted for the piston valve 15 here shown, and such valves could be operated by and in conjunction with other forms of mechanism to produce the same result as here described, without departing from the underlying principles of operation herein explained with reference to the particular forms of mechanism here shown.

The ports 43 are made small as shown in Figs. 1 and 2 and 3 to prevent the edges of the piston cup leather from catching in them, and the necessary total area of valve opening is obtained by using the plurality of these small ports or opening into the annular valve casing as shown.

In Fig. 3 is shown a cylinder having an internal sleeve valve. With the parts in the position shown in Fig. 3, the clutch is fully disengaged. As the pedal 7 is depressed the sleeve 61 is moved to the right by means of the rod 39, lever 62 moving on fixed pivot 62a, connecting link 68 and lug 69 on said sleeve valve 61. This disconnects the ports 101 from the port-casing 65 and from the manifold 25. A sufficient movement in this direction connects ports 101 with the port-casing 66 and at the same time connects the ports 102 with the port casing 67. This disconnects the cylinder 9 from the vacuum in the intake manifold 25, and connects the same part of the interior of the cylinder, viz: that part to the left of the piston 10, to the atmosphere by means of the ports 101, port-casing 66, conduit 64, port casing 67, ports 102 and ports 42, thus allowing piston 10 to move rapidly to the right under the pull of the clutch springs 2a, until said piston laps and closes the ports 102. When the piston closes the ports 102 the part of the cylinder interior to the left of the piston is thereby automatically disconnected from the atmosphere, and a partial vacuum sufficient to retard the further motion of the piston to the right is formed in the cylinder to the left of the piston. This partial vacuum is formed entirely by the pull of clutch springs 2a on the piston. The piston rod connection to the clutch lever 1 is adjusted to be of a length such that when the piston has just closed the ports 102, and the motion of said piston is retarded as above mentioned, the clutch will then be slightly engaged and will thereafter slowly complete its engagement as air enters the cylinder, to the left of the piston, slowly from the leakage port 56. The object of the port 56 is (as in Figs. 1 and 2) to allow the partial vacuum in the cylinder, to the left of the piston, to be gradually dispelled, thereby allowing the clutch to become fully engaged after a very short period of time has elapsed, and also to prevent the clutch from becoming disengaged as might result from leakage of air from the cylinder interior to the left of the piston to the intake manifold around piston section 32 of valve 15 (looking at Figs. 1 or 2) or around sleeve valve 61 (looking at Fig. 3), while the car is being run with the carbureter throttle in the idling position, or when the engine is being used as a brake in any gear with the throttle in the idling position.

To satisfy the various conditions of starting, free wheeling or coasting, driving, or braking with the engine, and changing gears at various car and engine speeds, a rapid disengagement of it up to a variable degree of initial engagement for the existing engine speed, and a variable rate of the completion of engagement of said clutch from the point of said initial engagement, are all necessary, and to suit these conditions we have devised other forms of our invention which are shown in Figs. 4, 5 and 6, in addition to that shown in Fig. 3 and above described, in all of which a timing of the initial action of the valve which produces the change from the first to the second stage of clutch engaging movement may be effected by the operator's manipulation of pedal 7.

Thus, referring to Fig. 3 it will be seen that by further depressing the pedal 7 beyond the position there shown, the ports 102 of the sleeve valve 61 will be moved further to the right before the ports 102 can be closed by said piston and the aforementioned retarding action takes place, thereby increasing the amount of the initial engagement of the clutch, and also proportionately increasing the power of the engine when it occurs, because the throttle will then have been partially opened beyond its idling position.

The object of the lost motion in the throttle connection, as shown in all the figures of drawing, is to allow the clutch to be engaged before the throttle valve of the carbureter is opened from the idling position, so that the car can be run, if desired, with the throttle in the idling position and the engine then used as a brake, in any gear, to the maximum amount possible; but this position of the parts can also be overrun by a further depression of pedal 7, and this is usually done eventually in ordinary starting operations. The amount of said lost motion is adjustable, as shown in detail in Fig. 8, by screwing sleeve 37 onto accelerator rod 36 and locking it in any position of adjustment thereon by means of locknut 49.

Referring to Fig. 4, the requirements specified in the last preceding paragraph are met as follows, the parts being shown in the position with the clutch fully disengaged.

By depressing the pedal 7 to the point where the lost motion in the throttle connection has been taken up, the valve 15 will be moved to the left, disconnecting the cylinder interior to the left of piston 10 from the intake manifold 25 and connecting it with the atmosphere through the right hand open end of valve casing 18. The balanced piston valve 15, with the pedal 7 in this position, however, soon thereafter disconnects the cylinder interior to the left of piston 10 from the atmosphere through a reversal of its movement, automatically produced by means of the compensating mechanism composed of the floating lever 74, pivot pins 70, 72, 76 and 77, and link 71, said compensating movement occurring whenever the piston has moved to the right to a point where the clutch is partially engaged. At this point a partial vacuum is formed in the cylinder to the left of the piston 10, as the piston tries to continue its motion to the right under the action of the clutch lever springs 2a, and the second or slower stage of clutch engagement then begins. This is continued by the action of the leakage port 56, which thereafter accomplishes the same result as the leakage port 56 in Fig. 3, i. e., allowing air to slowly enter behind the piston 10 during the remainder of its travel to the right, if pedal 7 remains stationary. By further depressing pedal 7 an increased degree of the initial engagement of the clutch is obtained, since then the piston moves further to the right before the piston valve thus automatically disconnects the cylinder interior to the left of piston 10 from the atmosphere by action of floating lever 74, and the power of the engine is increased proportionately, due to the partial opening of the carbureter throttle resulting, as the lost motion in the throttle connection has been theretofore taken up. The portion 34 of piston valve 15 has sufficient lap, in relation to the ports 19, to thus permit of closing them without simultaneously opening the intake manifold connection, or allowing the final movement of piston 10 to open such connection.

Referring to Fig. 5, when pedal 7 is depressed to the point where the lost motion in the throttle connection has been taken up, the balanced piston valve 15 similarly disconnects the cylinder interior to the left of piston 10 from the intake manifold, and the consequent motion of lever 83 reduces the tension of spring 81, so that the air inlet valve 84, which is in effect a reducing valve, thereupon opens and admits enough air to reduce the vacuum in the cylinder, to the left of the piston 10, to a point such that the piston is allowed to move to the right far enough to permit the clutch to become partially engaged. At this point the remaining partial vacuum in the cylinder to the left of the piston is just sufficient to counterbalance the reduced pull of the clutch springs 2a resulting from the partial movement of the clutch lever. Further slow movement of the piston is permitted by the air flowing in through leakage port 56, which is provided for the same purpose as the leakage port 56 in Fig. 3. By further depressing pedal 7, an increased initial degree of engagement of the clutch may be obtained, as the tension of the spring 81 is thereby further reduced, thus further reducing the degree of partial vacuum maintainable by valve 84 in the cylinder to the left of the piston. At the same time the power of the engine is proportionately increased on account of the opening of the throttle valve then simultaneously occurring. The closing of the valve 84 occurs whenever the subatmospheric pressure in cylinder 9 rises to a certain amount predetermined by the tension of spring 81. Some rise of pressure will always occur whenever the outward movement of piston 10 under the pull of the clutch closing spring 2a slows down, and when such increase of internal pressure has reduced the remaining excess of pressure of the exterior atmosphere on the outer face of valve 84 to a given extent, spring 81 will close it. Such slowing down may result from the diminishing pull of the clutch closing springs as their extent of flexure is reduced in the final stages of the clutch closing movement, or may result from any sufficient slowing down of the speed of the piston movement resulting from other causes, as by the friction of the initial engagement of the clutch members. The latter occurrence will produce a rise of pressure sufficient to close valve 84 and a slower, second and final stage of clutch closing action will then follow, since air can thereafter enter the cylinder 10 only slowly through leakage port 56.

Referring to Fig. 6, as pedal 7 is depressed to a point where the lost motion in the throttle connection has been taken up, as shown, the part of the cylinder interior to the left of the piston 10 is disconnected from the intake manifold 25 and connected to the atmosphere through the right hand open end of valve casing 18. The valve sleeve 98 has been moved into the position shown and the ports 97 in the hollow piston rod have been closed by the motion to the right of said hollow piston rod 3. Sufficient pressure has therefore been formed in the cylinder, to the right of the piston 10, to check further movement of the piston as the air so trapped can no longer flow out through the ports 95, bore or passageway 96 and ports 97. When the piston has reached this point the clutch is partially engaged, and thereafter the leakage port 56 acts for the same purpose as in Fig. 2, i. e., permitting further slow movement of the piston. By further depressing pedal 7, an increased degree of engagement of the clutch is initially obtained as the piston 10 must move further to the right before closing the ports 97. When pedal 7 is released and retracted by spring 54, the piston valve 15 moves to the right, thus disconnecting the cylinder interior, to the left of the piston, from the atmosphere and connecting it to the intake manifold 25. The piston 10 then moving to the left to disengage the clutch forms a partial vacuum in the cylinder interior to the right of it, but said partial vacuum is released by the opening of automatic inlet valve 94 before it becomes great enough to check the piston movement, and is completely dispelled as soon as the ports 97 are opened to the atmosphere by the movement of piston rod 3 through sleeve 98, to the left.

We are aware that heretofore it has been proposed to employ either the sub-atmospheric pressures in the intake manifold, or compressed air derived from other sources, or the exhaust gases delivered under pressure from the motor, to furnish pneumatic power for operating a motor car clutch, but, so far as we are aware, no automatic means, nor any means independent of the main clutch operating mechanism, have been provided for varying the speed of movement of the clutch engaging lever or other fluid-pressure clutch-actuating mechanism. In prior pneumatic devices of this character, if the air was allowed to flow through certain cylinder ports rapidly throughout the clutch engaging movement, the clutch closed with a jump that produced heavy strains on the car mechanism and was most disconcerting to the car occupants. If, on the other hand, the air was admitted or expelled too slowly, the clutch slipped badly for a considerable portion of each operation of engagement. What was and is needed is the most rapid movement toward, and up to, the position of initial engagement of the clutch members, and thereafter slower completion of such engaging operation producing a gradual increase of the pressure, and correspondingly of the friction, between said members. This, theoretically, might have been achieved by expert manipulation of the clutch controlling valve shown in Patent No. 1,470,272 granted to Rose I. Belcia, Oct. 9, 1923, or in other later patents, but practically no such dexterity of manual operation was possible. Our invention, however, automatically produces the above stated desirable and really necessary mode of operation of clutches actuated by fluid pressure, and does it by means the operation of which is independent of the operation of the primary clutch actuating mechanism. That is to say, if our automatic independent attachment is taken off, the mechanism of the prior art such as is here shown can still be operated manually. When our invention is used in a vacuum-power clutch-operating apparatus the flow of air to the vacuum cylinder will be automatically graduated to produce the above described two-stage clutch engaging movement, but this automatic two-stage mechanism is independent of the primary clutch-operating power-means, since it may be cut out of action, or removed, and still leave the remaining apparatus operable under manual control.

In Fig. 3 the port casings 65, 66 and 67 are in the form of annular grooves in the interior walls of the cylinder 9 and really form annular ports in said cylinder walls, to which conduits 26 and 64 are connected, and with which the reciprocating sleeve valve 61 cooperates.

In this construction shown in Fig. 3 it is important to prevent leakage of air around the left hand end of sleeve 61 and for this purpose the cylinder head is provided with an internal annular lip 103 which fits closely into the end of sleeve 61, as there shown. We have also shown at 104, 104, air ports in the cylinder head opening into the annular space or pocket so formed to permit air to enter, or be discharged from, it and so balance at all times the atmospheric pressure exerted against the other end of said sleeve.

The rubber hose sections 14, 14, will not collapse even under the maximum partial vacuum created in them, if made with thick walls, such as are now common in the hose used on tire pumps.

As the valve controlling the suction conduit 26, extending from the stationary intake manifold 25 to the swinging cylinder 9, is mounted on, or formed in, said cylinder in each of Figs. 3, 4, 5 and 6, the necessary rubber hose section is inserted in said conduit 26 in those figures of the drawings.

Throttle closing spring 31 is anchored to any convenient, fixed portion of the chassis or motor, at 60, as shown in all six modifications.

Having now fully described our invention, what we claim, is:

1. In a vacuum power clutch mechanism for motor cars comprising an intake manifold having a branch conduit connected to the closed end of a cylinder, the other end of which cylinder is open to the atmosphere, said cylinder being mounted on the car and containing a piston operatively connected to a clutch actuating member on said car, the combination, with said above described mechanism, of a second conduit communicating at each end with the interior of said cylinder through ports in the latter's walls, one such port being located near said closed cylinder end and another being located much nearer said open cylinder end at a point which will be reached by said piston whenever its motion has brought said clutch actuating member substantially to a position producing initial clutch engagement.

2. In an apparatus for actuating by fluid pressure a movable member of a mechanism adapted to operate a power transmitting clutch such as is employed in motor cars, the combination, with said above described apparatus, of automatic means adapted to produce a relatively rapid flow of the fluid to effect a correspondingly rapid clutch engaging movement of said clutch operating member followed by a relatively slower flow of said fluid during the final stages of said engaging movement, in which apparatus said variations in velocity of flow of the fluid are created in a vacuum cylinder connected to the intake manifold of the car motor and containing a piston connected to said operating member, and in which a spring is employed for producing the clutch engaging movement of said operating member, said automatic means comprising a port in the cylinder wall located at the point in the line of piston travel at which the relatively slow final clutch engaging movement of said clutch operating member is to begin, which port is adapted to afford communication from the atmosphere to the vacuum space in said cylinder during the initial, rapid clutch engaging movement of said member.

3. In a pneumatic apparatus for actuating a movable member of a mechanism adapted to operate the power transmission clutch of a motor car, comprising a cylinder open to the atmosphere at one end and connected to the intake manifold of the motor at the other, a manually operated valve in said connection, a piston in said cylinder connected to said clutch operating member, and a spring normally tending to produce a clutch engaging movement of said member, whereby, when said valve in the intake manifold connection is opened, said member will be pulled into a clutch disengaging position, the combination, with said above described apparatus, of automatic means adapted to produce a relatively rapid clutch engaging movement of said movable member followed by a slower movement for completion of the engagement, comprising two ports in said cylinder walls, one of which is located at a point intermediate of the ends thereof while the other is located near that end of the cylinder to which the intake manifold is connected, a conduit extending between said ports, and means for closing passage through said conduit when said valve controlling said intake manifold connection is opened, and for opening said passage when said valve is closed; whereby; when said valve is closed, air may flow through said conduit into the space in said cylinder behind said piston until the spring has caused a movement thereof sufficient to make it lap the first above mentioned port.

4. A combination such as defined in claim 3 in which said conduit passage controlling means comprises an extension of said valve located in an extension of the valve casing, and in which said casing extension is provided with a constantly open leakage port.

5. A combination such as defined in claim 3 in which said conduit is provided with a permanently open leakage port of relatively small cross section; whereby a continued but slower clutch engaging movement of said clutch operating member is permitted after said port lapping has occurred.

6. In a pneumatic apparatus for actuating the clutch of a motor car comprising a clutch lever, a spring normally forcing said lever in a direction to effect clutch engagement, a cylinder provided with ports for the passage of air into and out of its interior, a piston therein connected to said lever, means for causing air to flow through said cylinder ports for producing reciprocations of the piston, and mechanism for controlling said flow, a pedal free from mechanical connection to said clutch lever, a spring holding said pedal in retracted position when relieved from foot pressure, and an operative connection from said pedal to said air controlling mechanism adapted to effect a clutch engaging movement of said clutch lever when said pedal is pressed to flex said spring, the combination, with said above described apparatus, of automatic means cooperating with said flow control mechanism to produce a relatively rapid flow of air through certain of said ports during the initial clutch engaging movements of the apparatus, and a slower flow through certain of said ports during the latter portion of said clutch engaging movements; whereby, when said pedal is depressed, a two-stage rate of clutch closing movement will be produced.

7. An apparatus such as defined in claim 6 combined with means for varying the extent of the first mentioned stage of rapid movement in direct proportion to the extent to which said pedal is depressed.

8. An apparatus such as defined in claim 6 combined with a throttle valve for said motor and mechanism adapted to establish an operative connection between said pedal and said throttle valve substantially simultaneously with the termination of said stage of rapid flow of air through said certain cylinder ports.

9. In a vacuum-power clutch-operating mechanism comprising a clutch actuating member, a motor controlling element, a vacuum operated means for producing a rapid clutch disengaging movement of said member, and means for producing a clutch engaging movement thereof upon release of said vacuum, the combination, with said above described mechanism, of means independent thereof for graduating the clutch engaging movement of said member so as to produce a rapid initial movement up to a position which will cause a partial engagement of the clutch, and thereafter a completion of said clutch engaging movement at a slower rate of speed, together with means for varying the degree of pressure of such partial clutch engagement by the adjustment of said motor controlling element.

10. In a pneumatically operated clutch actuating apparatus comprising a movable clutch controlling member, a spring tending to move said member in a direction to close the clutch and a pneumatic motor device tending to move said member in a clutch opening direction when air is exhausted therefrom, the combination with said above described apparatus of a valve controlling the admission of air to the interior of said motor device, means for automatically closing said valve whenever the subatmospheric pressure in said motor device rises to a certain amount, and additional means for admitting air to said motor device in very small volume; whereby, after said automatically controlled valve has been closed, air may still be admitted to the interior of said motor device, but much more slowly, the original speed of clutch closing being thereby correspondingly slowed down.

11. In a clutch control device for motor vehicles, a power device connected to the clutch capable of releasing it, a control device for the power device to cause it to function to release the clutch, and automatic means controlled by movement of the clutch to irregularly control said power device in the engagement of the clutch, said control device comprising manually operable means for markedly modifying the action of said automatic means automatically adjusted during any one clutch engagement movement by a person seated in such vehicle.

12. In a power-operated, clutch-actuating apparatus for motor vehicles comprising a movable clutch control member, spring means tending to move said member in one direction which will close the clutch, a pneumatic motor device connected to said clutch control member and acting when air is exhausted from its interior to move said member in an opposite direction and open the clutch, and manually operable means for controlling said motor, the combination, with said above described apparatus, of automatic means operating synchronously with said motor device to reduce the speed of the clutch-closing movement of said clutch-controlled member at and after a predetermined point, approximating that producing initial contact of the clutch surfaces, has been reached, but without completely arresting said movement, said automatic means, however, being controllable through manipulation of said manually operable means at the option of the manipulator while seated in such vehicle.

13. In a pressure differential operated power clutch control device for motor vehicles, a power actuator including stationary and movable members, said movable member being connected to the clutch for effecting disengaging movement thereof, manually operable means for controlling the clutch disengaging and engaging operations of the power actuator and means for controlling said power actuator to effect an irregular engaging movement of said clutch, said first-mentioned means including means for rendering said second-mentioned means ineffective thereby permitting a substantially uniform clutch engagement.

14. In a pressure differential operated power clutch control device for motor vehicles, a power actuator including stationary and movable members, said movable member being connected to the clutch for effecting disengaging movement thereof, manually operable valve means for controlling the clutch disengaging and engaging operations of the actuator, said valve means comprising a ported casing and a reciprocable piston element housed within said casing, and means for controlling said power actuator to effect an irregular engaging movement of said clutch, said first-mentioned means including means, selectively operable at the will of the driver and constituted by said ported casing and reciprocable piston, for rendering said second-mentioned means ineffective thereby permitting a substantially uniform clutch engagement.

15. An automatic pneumatic clutch-operating mechanism for motor cars comprising, in combination, a cylinder, a clutch actuating member, a piston in said cylinder, a connection from said member to said piston adjustable as to length and means for checking the normal movement of said piston at a predetermined point in said cylinder during that portion of its travel therein which produces a clutch engaging operation.

16. An apparatus such as defined in claim 15 combined with a device manually operable to vary the location of said predetermined point.

17. A pneumatic clutch-operating mechanism for motor cars comprising, in combination, a clutch controlling member, a pneumatically-operated power-developing element operatively connected to said member, automatic means for checking the normal motion of said member at a predetermined point during that portion of its travel which produces a clutch engagement, and a manually controllable device for varying the speed of movement of said member during its travel beyond said predetermined point while completing said clutch engagement which is adjustable by a person while seated in such motor car.

18. Apparatus of the character described comprising a power device connected to an operating member of a motor vehicle clutch, control means operable for rendering said power device operative to move said member into inoperative position and for releasing it for movement toward operative position, means automatically operative as said member approaches operative position for checking the movement thereof, and control means for thereafter causing further retarded movement of said member toward its final clutch closing position.

19. The combination, with a motor vehicle engine and clutch operating member therefor having a normal bias to clutch engaging position, of a power device connected to said clutch operating member, control means operable for rendering said power device operative to move said member to clutch disengaging position and for releasing it for movement toward clutch engaging position, means automatically operative as the clutch controlling member approaches clutch closing position for checking the movement thereof, and control means for subsequently causing retarded movement thereof into its final clutch closing position.

20. Apparatus for the character described comprising a power device connected to an operating member of the motor vehicle clutch, control means operable for rendering said power device operative to move said member to clutch inoperative position and for releasing it for movement toward clutch operative position, means for controlling the latter movement comprising means connected to the aforementioned clutch operating member, operated thereby, and operable to check its clutch-engagement-producing movement, and further comprising means for controlling the completion of such movement after the same has been initially checked.

21. Apparatus of the character described comprising a power device operatively connected to a motor vehicle clutch, a control device for said power device movable in one direction for actuating the power device to disengage the clutch and movable in the opposite direction for releasing the clutch for return movement toward engaged position, means operative when the elements of the clutch reach an intermediate position substantially at the point of initial engagement for checking the movement of such elements, and means operative for releasing the clutch elements for movement to operative position after they have been checked in such intermediate position.

22. In a pneumatic apparatus for actuating a movable member of a mechanism adapted to operate the power transmission clutch of a motor car, comprising a cylinder open to the atmosphere at one end and connected to the intake manifold of the motor at the other, a manually operable valve in said connection, a piston in said cylinder connected to said clutch operating member, and a spring normally tending to produce a clutch engaging movement of said member, whereby, when said valve in the intake manifold connection is opened said member will be pulled into a clutch disengaging position, the combination, with said above described apparatus, of automatic means adapted to produce a relatively rapid clutch engaging movement of said movable member followed by a slower movement for completion of the engagement comprising a valve adapted to open and admit air to that end of said cylinder which is connected to said manifold, a spring normally tending to hold said valve closed and having a degree of tension sufficient to hold it closed during the latter portion of the travel of said movable member which produces clutch engagement while the force of said clutch closing spring is partially reduced, but permitting said valve to open while the piston is subjected to the pull of the full force of said clutch springs at the beginning of its outward movement, said spring being connected to said valve at one end and to a lever at the other, and an operative connection from said lever to said engine-controlling pedal such that as the latter is moved to increase the power being delivered by the engine it will so swing said lever as to decrease the tension on said spring, and automatic means for holding said valve closed during the clutch disengaging movement of said piston and movable member connected thereto.

23. An apparatus of the character described comprising a power device connected to an operating member of a motor vehicle clutch, control means operable for rendering said power device operative to move the clutch to inoperative position and for releasing the clutch elements for movement toward operative position, means automatically operative as the clutch elements approach operative position for checking the movement of such elements, and control means for causing retarded movement of the clutch elements into engagement with each other.

24. Apparatus of the character described comprising a power device operatively connected to a motor vehicle clutch, a control device for said power device movable in one direction for actuating the power device to disengage the clutch and movable in the opposite direction for releasing the clutch for return movement toward engaged position, means operative when the elements of the clutch reach an intermediate position substantially at the point of initial engagement for checking the movement of such elements, and means operative for releasing the clutch elements for movement to operative position after they have been checked in such intermediate position, said last named means being operative for retarding the rate of movement of the clutch elements into engagement with each other.

25. Apparatus of the character described comprising a power device operatively connected to a motor vehicle clutch, a control device for said power device movable in one direction for actuating the power device to disengage the clutch and movable in the opposite direction for releasing the clutch for return movement toward engaged position, means operative when the elements of the clutch reach an intermediate position substantially at the point of initial engagement for checking the movement of such elements, means for releasing the clutch elements for movement to operative position after they have been checked in such intermediate position, an accelerator pedal connected to the throttle of the motor vehicle engine, and means operative upon depression of the accelerator pedal from idling position for rendering said last named means operative.

26. Apparatus of the character described comprising a differential pressure power device operatively connected to a motor vehicle clutch, a manually operable valve, and a valve connected to the power device, said manually operable valve being movable from normal to operative position to connect the power device to a source of differential pressure to disengage the clutch and being movable to an intermediate position for disconnecting the power device from the source of differential pressure and connecting it to the atmosphere, said second named valve being operative substantially at the point of initial engagement of the clutch elements for closing communication between the power device and the atmosphere for checking the clutch elements in such position, said first named valve being operable from such intermediate position toward normal position to establish relatively slow communication between the power device and the atmosphere independently of said second named valve.

27. Apparatus of the character described comprising a differential pressure power device operatively connected to a motor vehicle clutch, a valve device movable in one direction for connecting the power device to a source of differential pressure and movable in the opposite direction for disconnecting the power device from the source of differential pressure and connecting it to the atmosphere, means operative when the clutch elements reach an intermediate position substantially at the point of initial engagement for rendering the valve device ineffective for connecting the power device to the atmosphere whereby movement of the clutch elements will be checked, and means operative for reestablishing pressure equalization in said power device to permit the clutch elements to move into engagement with each other after they have been checked in such intermediate position.

28. Apparatus of the character described comprising a differential pressure power device operatively connected to a motor vehicle clutch, a valve device movable in one direction for connecting the power device to a source of differential pressure and movable in the opposite direction for disconnecting the power device from the source of differential pressure and connecting it to the atmosphere, means operative when the clutch elements reach an intermediate position substantially at the point of initial engagement for rendering the valve device ineffective for connecting the power device to the atmosphere whereby movement of the clutch elements will be checked, means for reestablishing pressure equalization in said power device to permit the clutch elements to move into engagement with each other after they have been checked in such intermediate position, an accelerator pedal connected to the throttle of the motor vehicle engine, and means operative upon depression of the accelerator pedal from idling position for rendering said last named means operative.

29. Apparatus of the character described comprising a power device operatively connected to a motor vehicle clutch, and a control device for said power device having a member movable in one direction from normal position for effecting actuation of the power device to disengage the clutch, said control device including a second member operable when said first named member is moved back to an intermediate position toward normal position for permitting movement of the operating elements of the clutch approximately to the point of initial engagement and for checking the clutch elements in such position, the first named member of said control device being further movable back toward normal position to effect relatively gradual engagement of the clutch elements.

30. Apparatus of the character described comprising a power device operatively connected to a motor vehicle clutch, and a control device for said power device having a member movable from normal position to an operative position for effecting actuation of the power device to effect disengagement of the clutch, said control device being movable directly from operative position back to normal position to effect relatively rapid engagement of the operating elements of the clutch, said control device including a second member operable when said first named member is moved to an intermediate position toward normal position to permit movement of the operating elements of the clutch substantially to the point of initial engagement and for checking the clutch elements in such position.

31. An apparatus constructed in accordance with claim 30 wherein the first named member of said control device is movable from said intermediate position toward normal position for effecting relatively slow engagement between the operating elements of the clutch.

32. Apparatus of the character described comprising a differential pressure power device operatively connected to a motor vehicle clutch, and valve mechanism for controlling said power device and including a valve movable from normal to operative position for connecting the power device to a source of differential pressure, said valve mechanism including a second valve operable when said first named valve is moved from said operative position to an intermediate position for disconnecting the power device from the source of differential pressure and conecting it to the atmosphere and operative for disconnecting the power device from the atmosphere when the clutch elements reach an intermediate position substantially at the point of initial engagement whereby movement of the clutch elements is checked in such position, said first named valve being movable from its intermediate position toward normal position for slowly establishing pressure equalization in said power device.

33. Apparatus of the character described comprising a power device operatively connected to a motor vehicle clutch, a control device for effecting actuation of said power device to disengage the clutch and to release the clutch elements for return movement toward engaged position, means operative when the clutch elements reach an intermediate position for checking the movement of the clutch elements, and means operative for releasing the clutch elements for movement to engaged position after they have been checked in such intermediate position.

34. Apparatus of the character described comprising a power device operatively connected to a motor vehicle clutch, a control device for effecting actuation of the power device to disengage the clutch and to release the clutch elements for return movement toward engaged position, means operative when the clutch elements reach an intermediate position for checking the movement of the clutch elements, and means operative for releasing the clutch elements for movement to operative position after they have been checked in such intermediate position, said last named means being operative for retarding the rate of movement of the clutch elements into engagement with each other.

35. Apparatus of the character described comprising a power device operatively connected to a motor vehicle clutch, a control device for effecting actuation of said power device to disengage the clutch and to release the clutch for return movement toward engaged position, means operative when the elements of the clutch reach an intermediate position for checking the movement of such elements, means for releasing the clutch elements for movement to engaged position after they have been checked in such intermediate position, an accelerator pedal connected to the throttle of the motor vehicle engine, and means operative upon depression of the accelerator pedal from idling position for rendering said last named means operative.

36. Apparatus of the character described comprising a differential pressure power device operatively connected to a motor vehicle clutch, a valve device for connecting the power device to a source of differential pressure and for disconnecting the power device from the source of differential pressure and connecting it to the atmosphere, means operative when the clutch elements reach an intermediate position for rendering the valve device ineffective for connecting the power device to the atmosphere whereby movement of the clutch elements will be checked, and means operative for reestablishing pressure equalization in said power device to permit the clutch elements to move into engagement with each other after they have been checked in such intermediate position.

37. Apparatus of the character described comprising a differential pressure power device operatively connected to a motor vehicle clutch, a valve device for connecting the power device to a source of differential pressure and for disconnecting the power device from the source of differential pressure and connecting it to the atmosphere, means operative when the clutch elements reach an intermediate position for rendering the valve device ineffective for connecting the power device to the atmosphere whereby movement of the clutch elements will be checked, means operative for reestablishing pressure equalization in said power device to permit the clutch elements to move into engagement with each other after they have been checked in such intermediate position, and means for controlling the rate of movement of the clutch elements into engagement with each other.

38. Apparatus of the character described comprising a differential pressure power device operatively connected to a motor vehicle clutch, a valve device for connecting the power device to a source of differential pressure and for disconnecting the power device from the source of differential pressure and connecting it to the atmosphere, means operative when the clutch elements reach an intermediate position for rendering the valve device ineffective for connecting the power device to the atmosphere whereby movement of the clutch elements will be checked, means for reestablishing pressure equalization in said power device to permit the clutch elements to move into engagement with each other after they have been checked in such intermediate position, an accelerator pedal connected to the throttle of the motor vehicle engine, and means operative upon depression of the accelerator pedal from idling position for rendering said last named means operative.

39. In a power transmission system for motor vehicles, an internal combustion engine, an engine accelerator, a clutch, a fluid pressure motor for operating said clutch, a source of fluid pressure, a conduit connecting said motor and source, and follow-up valve means interposed in said conduit for controlling the energization of said motor, said valve means including a part operated upon movement of the engine accelerator and a second part cooperating with the first part and movable by operation of said clutch in the same direction as the first part has been moved, so that it will follow up the previous movement of said first part and substantially reestablish the relative positions occupied by the two before the first movement was started.

40. An apparatus adapted to be installed on a motor car for automatically effecting disengagement and engagement of the clutch thereof which comprises the combination, with a vacuum cylinder adapted to be mounted on the chassis of such car and having a conduit communicating with the vacuum space therein adapted to be connected to the intake manifold of the car and also provided with manually operable means for opening and closing said connection, of a piston reciprocable in said cylinder and adapted to be operatively connected to a movable, clutch-controlling member on such car, and means including a port in the side wall of said cylinder for checking a clutch-engagement producing motion of said piston whenever it closes said port in the course of such movement.

41. An apparatus such as defined in claim 40 which is also provided with automatic means for admitting predetermined small quantities of air to said vacuum space after said port has been closed.

42. An apparatus such as defined in claim 40 which is also provided with automatic means for admitting predetermined small quantities of air to said vacuum space after said port has been closed and with manually operable means for admitting variably larger quantities of air to said space when the production of a more rapid final stage of clutch engaging movement is desired.

43. In a vacuum power clutch mechanism, the combination, with a motor car having an internal combustion motor, of a cylinder, having three internal annular grooves, one of said grooves being connected to the intake manifold of said motor and the two other grooves being connected together by a conduit having a small air leakage port, a sleeve valve in said cylinder, means for balancing said sleeve valve, said sleeve valve having ports cooperating with said annular grooves, a piston adapted to reciprocate in said sleeve valve provided with a piston rod of adjustable length operatively attached to a clutch operating member, an accelerator having a return spring, a carburetor throttle return spring and a throttle rod having adjustable lost motion, said accelerator being operatively connected to said sleeve valve, and said cylinder being mounted on the car frame, said parts cooperating substantially as set forth.

JAMES HARRY KEIGHLEY McCOLLUM.
HENRY JOHN DE NEVILLE McCOLLUM.